United States Patent
Ryu et al.

(10) Patent No.: US 11,888,778 B2
(45) Date of Patent: Jan. 30, 2024

(54) WIRELESS COMMUNICATION USING AN INDICATOR OF A JOINT CHANNEL ESTIMATION OPERATION FOR MULTIPLE DEMODULATION REFERENCE SIGNALS

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Peter Gaal, San Diego, CA (US); Xiaojie Wang, Hillsborough, NJ (US); Tianyang Bai, Somerville, NJ (US); Juan Montojo, San Diego, CA (US); Wooseok Nam, San Diego, CA (US); Yan Zhou, San Diego, CA (US); Xiaoxia Zhang, San Diego, CA (US); Jing Sun, San Diego, CA (US); Piyush Gupta, Bridgewater, NJ (US); Hua Wang, Basking Ridge, NJ (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/453,714

(22) Filed: Nov. 5, 2021

(65) Prior Publication Data
US 2023/0147638 A1 May 11, 2023

(51) Int. Cl.
*H04L 5/00* (2006.01)

(52) U.S. Cl.
CPC .......... *H04L 5/0051* (2013.01); *H04L 5/0023* (2013.01)

(58) Field of Classification Search
None
See application file for complete search history.

(56) References Cited

U.S. PATENT DOCUMENTS

| | | | |
|---|---|---|---|
| 2022/0061041 A1* | 2/2022 | Chen | H04L 5/0048 |
| 2022/0116247 A1* | 4/2022 | Sengupta | H04L 5/0094 |
| 2022/0416978 A1* | 12/2022 | Kalbasi | H04L 5/0053 |

* cited by examiner

Primary Examiner — Diane L Lo
(74) Attorney, Agent, or Firm — Norton Rose Fulbright US LLP/Qualcomm Incorporated

(57) ABSTRACT

In some aspects of the disclosure, an apparatus for wireless communication includes a receiver and a transmitter. The transmitter is configured to transmit a first transmission during a first time slot and to transmit a second transmission during a second time slot that is after the first time slot. The first transmission includes first data and a first demodulation reference signal (DMRS) associated with the first data, and the second transmission includes second data and a second DMRS associated with the second data. One or more of the first transmission or the second transmission further includes an indication of whether a joint channel estimation operation is to be performed based on the first DMRS and the second DMRS.

27 Claims, 8 Drawing Sheets

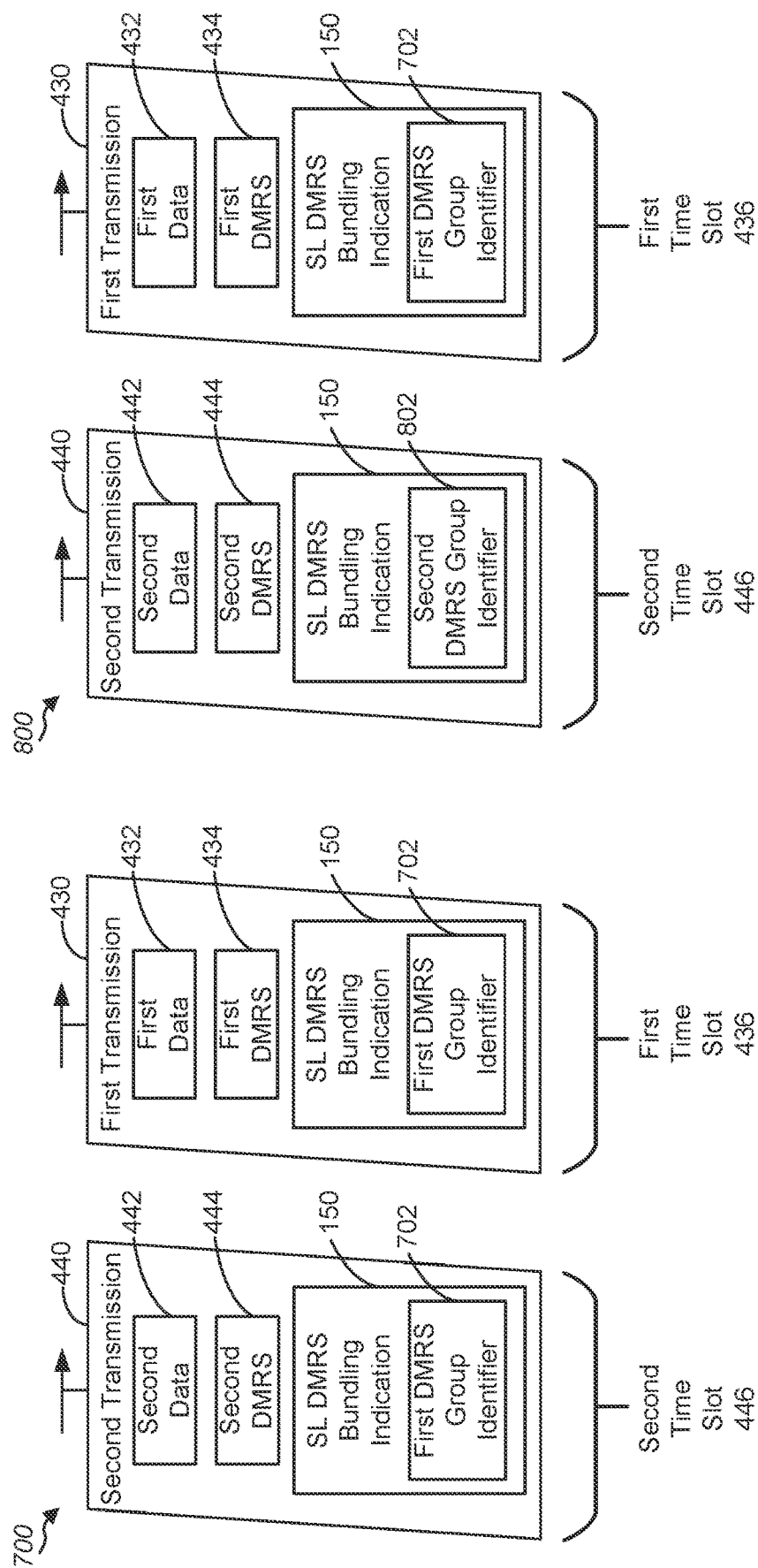

WIRELESS COMMUNICATION USING AN INDICATOR OF A JOINT CHANNEL ESTIMATION OPERATION FOR MULTIPLE DEMODULATION REFERENCE SIGNALS

TECHNICAL FIELD

Aspects of the present disclosure relate generally to wireless communication systems, and more particularly, to wireless communication systems that use demodulation reference signals.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

In some aspects of the disclosure, an apparatus for wireless communication includes a receiver and a transmitter. The transmitter is configured to transmit a first transmission during a first time slot and to transmit a second transmission during a second time slot that is after the first time slot. The first transmission includes first data and a first demodulation reference signal (DMRS) associated with the first data, and the second transmission includes second data and a second DMRS associated with the second data. One or more of the first transmission or the second transmission further includes an indication of whether a joint channel estimation operation is to be performed based on the first DMRS and the second DMRS.

In some other aspects of the disclosure, a method of wireless communication includes transmitting a first transmission during a first time slot. The first transmission includes first data and a first DMRS associated with the first data. The method further includes transmitting a second transmission during a second time slot that is after the first time slot. The second transmission includes second data and a second DMRS associated with the second data. One or more of the first transmission or the second transmission further includes an indication of whether a joint channel estimation operation is to be performed based on the first DMRS and the second DMRS.

In some other aspects of the disclosure, an apparatus for wireless communication includes a transmitter and a receiver. The receiver is configured to receive a first transmission during a first time slot and to receive a second transmission during a second time slot that is after the first time slot. The first transmission includes first data and a first DMRS associated with the first data, and the second transmission includes second data and a second DMRS associated with the second data. The receiver is further configured to perform, based on an indication included in one or more of the first transmission or the second transmission, a joint channel estimation operation using the first DMRS and the second DMRS.

In some other aspects of the disclosure, a method of wireless communication includes receiving a first transmission during a first time slot. The first transmission includes first data and a first DMRS associated with the first data. The method further includes receiving a second transmission during a second time slot that is after the first time slot. The second transmission includes second data and a second DMRS associated with the second data. One or more of the first transmission or the second transmission further includes an indication of whether a joint channel estimation operation is to be performed based on the first DMRS and the second DMRS.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 7 is a diagram illustrating another example of a communication scheme according to some aspects of the disclosure.

FIG. 8 is a diagram illustrating another example of a communication scheme according to some aspects of the disclosure.

DETAILED DESCRIPTION

Figure 1:
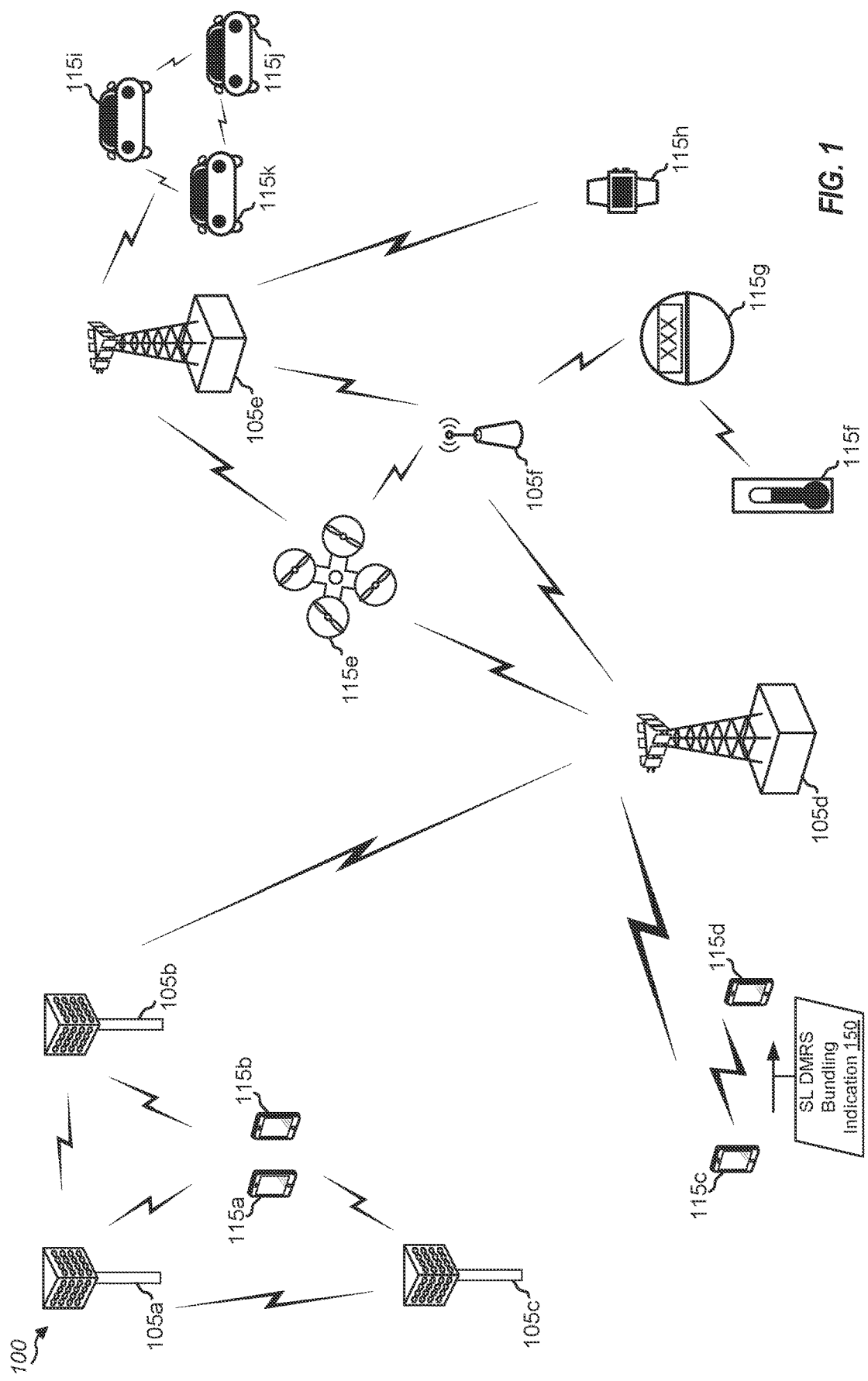
FIG. 1 is a block diagram illustrating details of an example wireless communication system according to some aspects of the disclosure.

Devices of wireless communication systems transmit and receive wireless signals that may be subject to noise and interference in a wireless communication channel. To compensate for the effects of noise and interference, reference signals may be used. A reference signal may include a reference pattern of bits of symbols, which may enable a receiver to estimate effects of noise or interference on a received signal. An example of a reference signal is a demodulation reference signal (DMRS). Based on a DMRS, a receiver may determine a channel estimate (which may indicate or be associated with an amount of noise or interference) and may use the channel estimate to demodulate a received signal.

In some circumstances, a receiver may be unable to accurately perform channel estimation. For example, if a signal-to-noise ratio (SNR) of a received signal is relatively low, then a channel estimate may be unreliable or may change relatively rapidly. In some implementations, the receiver may use multiple DMRSs to determine a joint channel estimate to improve accuracy of channel estimation, which may be referred to as "bundling" the DMRSs. In some circumstances, a transmitting device of the multiple DMRSs may be unable to maintain phase continuity between the multiple DMRSs. As a result, the multiple DMRSs may have different phases, which may reduce effectiveness of DMRS bundling by the receiver, potentially resulting in dropped packets, retransmissions, latency, or poor performance.

In some aspects of the disclosure, a transmitting device may include an indication in a transmission that specifies whether a DMRS of the transmission is to be bundled with another DMRS of a subsequent (or previous) transmission. For example, the indication may include a bit having a value that indicates whether the DMRS bundling is to be performed. The transmitting device may set the value of the bit based on a determination of whether the DMRSs have phase continuity. To illustrate, in some examples, the transmitting device may detect a loss of phase continuity based on one or more of a change of operation of a radio frequency (RF) device (e.g., from one of a transmit mode or a receive mode to the other of the transmit mode or the receive mode), a change of a beam associated with the RF device, a change of bandwidth associated with the RF device, or a change in a center frequency associated with the RF device. In such examples, the transmitting device may set the value of the bit to specify that DMRS bundling is disabled. In some other examples, the transmitting device may determine that the DMRSs have phase continuity and may set the value of the bit to specify that DMRS bundling is enabled.

Alternatively or in addition to the bit, in some other implementations, the indication may include an identifier (ID) of transmissions that are to be bundled. In such examples, a receiver may bundle DMRSs of transmissions that are associated with a common ID.

In some examples, the indication may specify that the transmissions are phase-continuous. In some other examples, the indication may specify that additional resources are included in a transmission to enable determination of a phase difference (or phase "jump") between the transmissions.

In some implementations, a transmitting device and a receiving device may commit (or "agree") to maintain phase continuity for at least a particular time interval (e.g., for a particular number of multiple time slots). As a result, the additional resources used to measure a phase difference (or phase "jump") between the multiple time slots may be unnecessary and may not be used in some implementations.

One or more aspects described herein may improve performance of a wireless communication system. For example, by selectively enabling or disabling DMRS bundling, a receiver may achieve benefits associated with DMRS bundling (such as improved channel tracking that may result from joint channel estimation) while also reducing complexity and power consumption by disabling DMRS bundling when DMRSs are not phase-continuous (which may avoid computational complexity and power consumption that may be associated with joint channel estimation). As a result, performance of the receiver may be enhanced.

In some implementations, one or more aspects described herein may be used for sidelink communications between multiple user equipments (UEs). In some implementations, the UEs may be battery-powered and may be mobile, in which case the UEs may be sensitive to power consumption. Further, if the UEs change physical location, channel tracking by the UEs may be more difficult as compared to a stationary device (e.g., due to rapidly changing wireless channel conditions). By selectively enabling or disabling DMRS bundling, the UEs may improve reliability of channel estimation (by using joint channel estimation based on "bundled" DMRSs, which may be advantageous in the presence of slowly changing wireless channel conditions) while also reducing power consumption (such as by disabling joint channel estimation in cases where phase discontinuity may reduce effectiveness of DMRS bundling). Alternatively or in addition, one or more aspects may be used in other implementations, such as for one or more of uplink communications, downlink communications, or other communications.

To further illustrate, some aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a satellite positioning system (SPS) device, a position/location determination device, a logistics controller, a robot/robotic device, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical/healthcare device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

In some wireless communication networks, a UE 115 may communicate with one or more other UEs 115 via one or more sidelink (SL) wireless communication channels. To facilitate SL wireless communications, a UE 115 may transmit a demodulation reference signal (DMRS) to another UE 115 to enable or assist the other UE 115 in receiving data from the UE 115. In some aspects of the disclosure, the UE 115 may transmit a SL DMRS bundling indication 150 indicating whether the other UE 115 is to "bundle" multiple DMRSs via a joint a channel estimation operation, as described further below.

Figure 2:
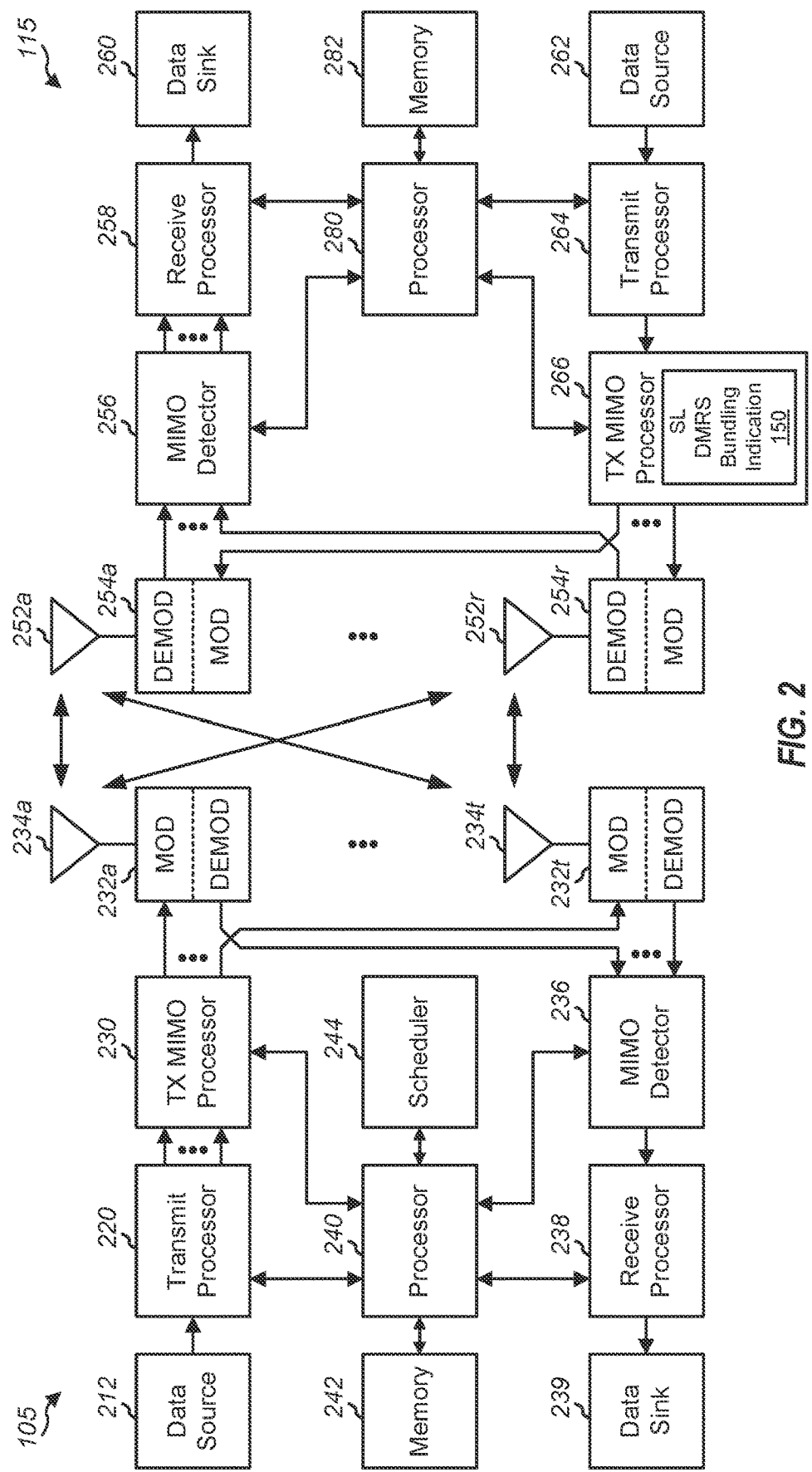
FIG. 2 is a block diagram illustrating examples of a base station and a user equipment (UE) according to some aspects of the disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 or other processors and modules at base station 105 or processor 280 or other processors and modules at UE 115 may perform or direct the execution of various processes for the techniques described herein, such as to perform or direct the execution illustrated in FIGS. 9 and 10, or other processes for the techniques described herein. As an illustrative example, in some implementations, the processor 280 may initiate or control transmission of the SL DMRS bundling indication 150 to another UE 115. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
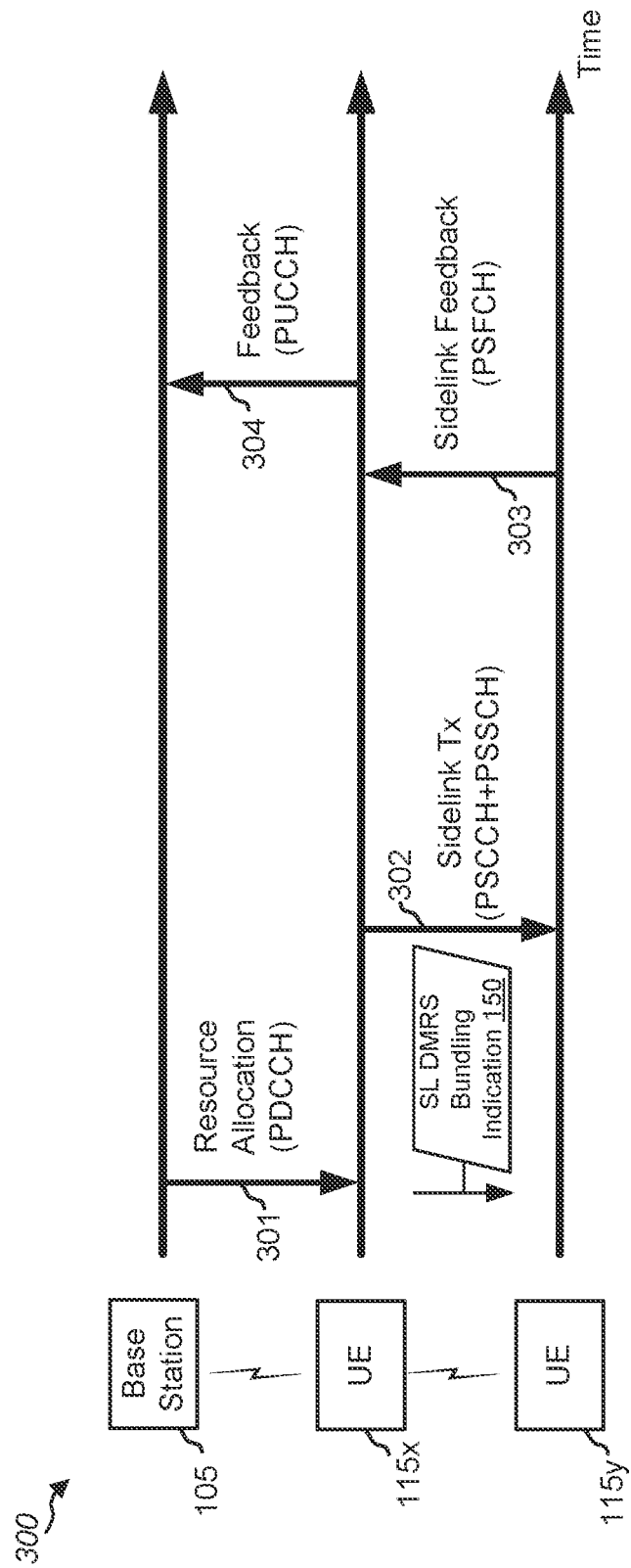
FIG. 3 is a diagram illustrating examples of operations that may be performed in connection with a wireless communication network according to some aspects of the disclosure.

FIG. 3 is a diagram illustrating examples of operations 300 that may be performed in connection with a wireless communication network according to some aspects of the disclosure. The operations 300 may be described with reference to a UE 115x (e.g., one of the UEs 115a-k of FIG. 1, or another UE), a UE 115y (e.g., another of the UEs 115a-k of FIG. 1, or another UE), and the base station 105. In some other examples, the operations 300 may be performed with respect to other UEs and other UE configurations.

The operations 300 may illustrate an example of a first mode of operation (Mode 1) in which resource allocation of Tx resources for sidelink communications is performed, at 301, by the base station 105. The first mode (Mode 1) may support dedicated grants (DGs) and configured grants (CGs) of type 1 and may further supported CGs of type 2. A CG of type 1 may be activated via RRC signaling from the base station 105. A modulation and coding scheme (MCS) may be determined by a transmitting UE, such as the UE 115x, within parameters set by the base station 105 (such as parameters indicated by the DCI). In some other aspects of the disclosure, one or more other operations described herein may be performed using one or more other modes of operation, such as a second mode of operation (Mode 2).

At 302, the UE 115x may perform a sidelink transmission (such as by transmitting sidelink control information (SCI), data, or a combination thereof) to the UE 115y via the sidelink. The sidelink may include a physical sidelink control channel (PSCCH), a physical sidelink shared channel (PSSCH), a physical sidelink feedback channel (PSFCH), one or more other channels, or a combination thereof. In some aspects, performing the sidelink transmission may include transmitting the SL DMRS bundling indication 150.

At 303, the UE 115y may transmit sidelink feedback to the UE 115x via the sidelink (e.g., via the PSFCH), such as an acknowledgement (ACK) or a negative-acknowledgement (NACK). At 304, the UE 115x may forward the sidelink feedback to the base station 105 (e.g., using a PUCCH). The base station 105 may perform one or more operations based on the sidelink feedback, such as resource allocation, as an illustrative example.

Figure 4:
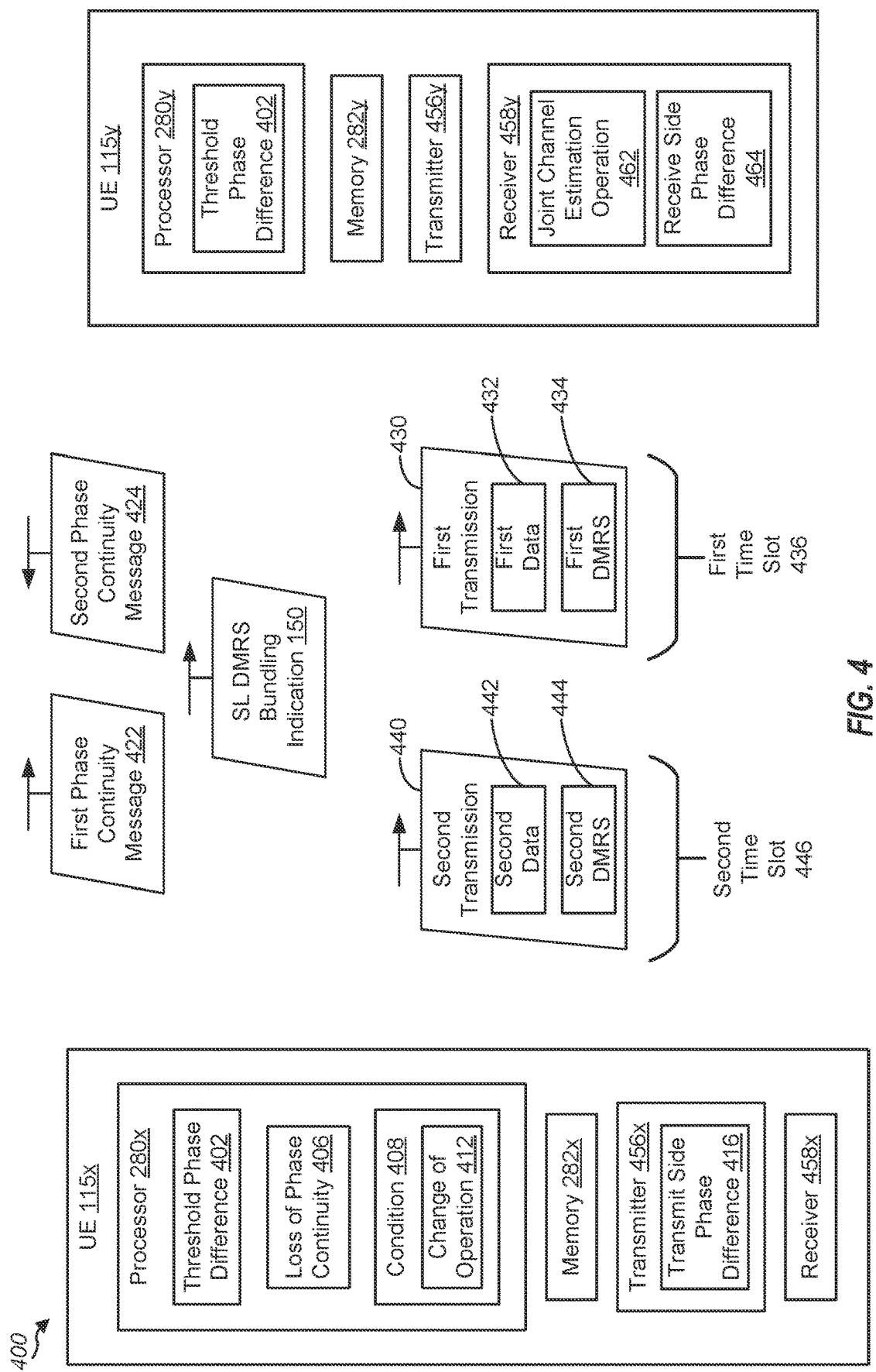
FIG. 4 is a block diagram illustrating an example of a wireless communication system according to some aspects of the disclosure.

FIG. 4 is a block diagram illustrating an example of a wireless communication system 400 according to some aspects of the disclosure. The wireless communication system 400 may include one or more UEs, such as the UE 115x and the UE 115y.

The UE 115x and the UE 115y may each include one or more processors (such as a processor 280x and a processor 280y), a memory (such as a memory 282x and a memory 282y), a transmitter (such as a transmitter 456x and a transmitter 456y), and a receiver (such as a receiver 458x and a receiver 458y). The processor 280x may be coupled to the memory 282x, to the transmitter 456x, and to the receiver 458x, and the processor 280y may be coupled to the memory 282y, to the transmitter 456y, and to the receiver 458y. In some examples, the transmitters 456x-y and the receivers 458x-y may each include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 456x and the receiver 458x may be integrated in one or more transceivers of the UE 115x, and the transmitter 456y and the receiver 458y may be integrated in one or more transceivers of the UE 115y.

Each transmitter 456x-y may be configured to transmit reference signals, synchronization signals, control information, and data to one or more other devices, and each receiver 458x-y may be configured to receive reference signals, control information, and data from one or more other devices. For example, the transmitter 456x may be configured to transmit signaling, control information, and data to the receiver 458y, and the receiver 458x may be configured to receive signaling, control information, and data from the transmitter 456y. To further illustrate, the transmitter 456y may be configured to transmit signaling, control information, and data to the receiver 458x, and the receiver 458y may be configured to receive signaling, control information, and data from the transmitter 456x.

In some implementations, one or more of the transmitter 456x, the transmitter 456y, the receiver 458x, or the receiver 458y may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, the wireless communication system 400 operates in accordance with a 5G NR network. For example, the wireless communication system 400 may include multiple 5G-capable UEs 115 and multiple 5G-capable base stations 105, such as UEs and base stations configured to operate in accordance with a 5G NR network protocol (such as the 5G NR network protocol defined by the 3GPP).

During operation, the UE 115x may communicate with the UE 115y using one or more sidelink channels, such as one or more of the PSCCH, the PSSCH, or the PSFCH of FIG. 3. To illustrate, the UE 115x may use the transmitter 456x to transmit a first transmission 430 to the UE 115y during a first time slot 436 and to transmit a second transmission 440 to the UE 115y during a second time slot 446. In some examples, the second time slot 446 occurs after the first time slot 436. The first transmission 430 may include first data 432 and a first DMRS 434 associated with the first data 432, and the second transmission 440 may include second data 442 and a second DMRS 444 associated with the second data 442.

To illustrate, in some examples, the UEs 115x-y may correspond to devices of a vehicle communication network, such as a vehicle-to-everything (V2E) wireless communication network. In some such examples, the first data 432 and the second data 442 may include maneuver information (e.g., a lane change indication), a traffic report, an accident alert, other data, or a combination thereof. In some other implementations, the UEs 115x-y may correspond to devices of a sensor network, and the first data 432 and the second data 442 may include sensor data (such as audio data, video data, or image data). In some other implementations, the UE 115x-y may correspond to Internet-of-everything (IoT) devices, and the first data 432 and the second data 442 may include IoT data.

The UE 115y may use receiver 458y to receive the first transmission 430 and to receive the second transmission 440. For example, the receiver 458y may use the first DMRS 434 to demodulate the first data 432 and may use the second DMRS 444 to demodulate the second data 442. In some cases, the receiver 458y may perform a joint channel estimation operation 462 that uses the first DMRS 434 and the second DMRS 444 to demodulate data (e.g., the first data 432, the second data 442, or both). As used herein, performing the joint channel estimation operation 462 using the first DMRS 434 and the second DMRS 444 may also be referred to herein as "bundling" the first DMRS 434 and the second DMRS 444.

In some aspects of the disclosure, the UE 115x transmits the SL DMRS bundling indication 150 to indicate to the UE 115y whether to bundle the first DMRS 434 and the second DMRS 444. Upon receiving the first transmission 430 and the second transmission 440, the UE 115y may perform either the joint channel estimation operation 462 or separate channel estimation operations based on the SL DMRS bundling indication 150. For example, the UE 115y may perform the joint channel estimation operation 462 based on the SL DMRS bundling indication 150 specifying that the first DMRS 434 is associated with the second DMRS 444. In some other examples, the SL DMRS bundling indication 150 may specify that the first DMRS 434 is not associated with the second DMRS 444, or the UE 115x may avoid transmitting the SL DMRS bundling indication 150. In such examples, the UE 115y may perform a first channel estimation operation based on the first DMRS 434 and independently of the second DMRS 444 and may perform a second channel estimation operation based on the second DMRS 444 and independently of the first DMRS 434.

In some examples, the UE 115x may transmit the SL DMRS bundling indication 150 based on a transmit side phase difference 416 between a first phase associated with the first transmission 430 and a second phase associated with the second transmission 440. If the transmit side phase difference 416 fails to satisfy (e.g., is less than, or is less than or equal to) a threshold phase difference 402, the UE 115x may transmit the SL DMRS bundling indication 150 to indicate to the UE 115y to bundle the first DMRS 434 and the second DMRS 444. In some other examples, if the transmit side phase difference 416 satisfies (e.g., is greater than, or is greater than or equal to) the threshold phase difference 402, the UE 115x may avoid transmitting the SL DMRS bundling indication 150 or may indicate via the SL DMRS bundling indication 150 that the first DMRS 434 and the second DMRS 444 are not to be bundled, as described further below. As used herein, if the transmit side phase difference 416 fails to satisfy the threshold phase difference 402, then the UE 115x may be referred to as maintaining phase continuity between the first transmission 430 and the second transmission 440.

To further illustrate, in some implementations, a loss of phase continuity 406 between the first transmission 430 and the second transmission 440 may occur based on one or more conditions, such as a condition 408. To illustrate, in some implementations, the condition 408 may include or may correspond to a change of operation 412 of a radio frequency (RF) device of the UE 115x. For example, the RF device may correspond to a transceiver that includes the transmitter 456x and the receiver 458x, and the change of operation 412 may be from one of a transmit mode or a receive mode to the other of the transmit mode or the receive mode. Alternatively or in addition, the change of operation 412 may include one or more a change of a beam associated with the RF device, a change of bandwidth associated with the RF device, or a change in a center frequency associated with the RF device. In some circumstances, the change of operation 412 may cause the loss of phase continuity 406. Based on detecting the change of operation 412, the UE 115x may detect the loss of phase continuity 406. Similarly, the UE 115y may experience a loss of phase continuity based on a change of operation of an RF device of the UE 115y, such as a transceiver that includes the transmitter 456y and the receiver 458y.

In some implementations, the UE 115x may transmit a particular reference signal to enable the UE 115y to determine a phase difference between the first DMRS 434 and the second DMRS 444. The first transmission 430 and the second transmission 440 may include the particular reference signal. In some such examples, the particular reference signal may enable the UE 115y to bundle the first DMRS 434 and the second DMRS 444 despite the loss of phase continuity 406. To illustrate, the particular reference signal may enable the UE 115y to determine a difference between the first phase associated with the first DMRS 434 and the second phase associated with the second DMRS 444 and to compensate for the difference (e.g., by adjusting the first phase, the second phase, or both).

Thus, in some examples, the UE 115x may transmit the SL DMRS bundling indication 150 based on the transmit side phase difference 416 failing to satisfy the threshold phase difference 402. Alternatively or in addition, if the transmit side phase difference 416 satisfies the threshold phase difference 402 (e.g., due to the loss of phase continuity 406), the UE 115x may transmit the SL DMRS bundling indication 150 and may also transmit a particular reference signal (or particular resources) to enable the UE 115y to compensate for the loss of phase continuity 406.

In some aspects, to reduce or eliminate the use of the particular reference signal (or particular resources), the UEs 115x-y may "agree" to maintain phase continuity between transmissions, such as the first transmission 430 and the second transmission 440. To illustrate, the UE 115x may transmit to the UE 115y a first message, such as a first phase continuity message 422. The first phase continuity message 422 may indicate that the transmit side phase difference 416 is to be less than the threshold phase difference 402. The UE 115y may transmit to the UE 115x a second message, such as a second phase continuity message 424. The second phase continuity message 424 may indicate that a receive side phase difference 464 between the first phase associated with the first DMRS 434 and the second phase associated with the second DMRS 444 is to be less than the threshold phase difference 402. By "agreeing" to maintain phase continuity with the UE 115y, the UE 115x may avoid transmitting a particular reference signal that enables the UE 115y to compensate for a phase difference between the first DMRS 434 and the second DMRS 444.

In some examples, the UEs 115x-y transmit the phase continuity messages 422, 424 based on scheduling data, which may indicate that no change of operation 412 is to occur during particular time slots. To illustrate, the first phase continuity message 422 may indicate a first set of time slots during which the UE 115x is to maintain phase continuity (e.g., based the scheduling data indicating that no change of operation 412 of the UE 115x is to occur during the first set of time slots). The second phase continuity message 424 may indicate a second set of time slots during which the UE 115y is to maintain phase continuity (e.g., based the scheduling data indicating that no change of operation 412 of the UE 115y is to occur during the second set of time slots). In some examples, the scheduling data may be specified by the base station 105 (e.g., in connection with a Mode 1 resource allocation operation) or may be negotiated by the UEs 115x-y.

Figure 5:
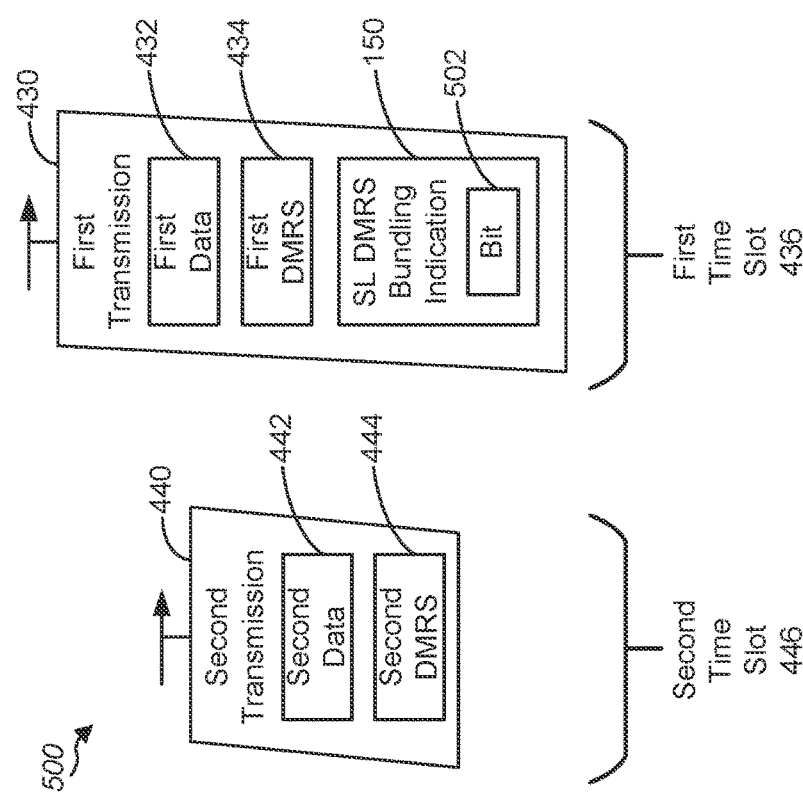
FIG. 5 is a diagram illustrating an example of a communication scheme according to some aspects of the disclosure.

FIG. 5 is a diagram illustrating an example of a communication scheme 500 according to some aspects of the disclosure. In the example of FIG. 5, the first transmission 430 includes the SL DMRS bundling indication 150, and the SL DMRS bundling indication 150 includes a bit 502. The bit 502 may have a value (e.g., a logic "0" value or a logic "1" value) indicating whether the joint channel estimation operation 462 is to be performed based on one or more subsequent DMRSs to the first DMRS 434, such as the second DMRS 444.

To further illustrate, a first value (e.g., a logic "0" value or a logic "1" value) of the bit 502 may indicate that bundling is enabled for N transmissions following the first transmission 430 (where N indicates a positive integer). As an illustrative example, if the bit 502 has the first value and if N corresponds to one, then the UE 115y may bundle the first DMRS 434 with one DMRS in a transmission subsequent to the first transmission 430 (such as the second DMRS 444 of the second transmission 440). A second value (e.g., a logic "1" value or a logic "0" value) of the bit 502 may indicate that bundling is disabled for the first transmission 430. In such examples, the UE 115y may avoid bundling the first DMRS 434 with another DMRS (such as the second DMRS 444).

Figure 6:
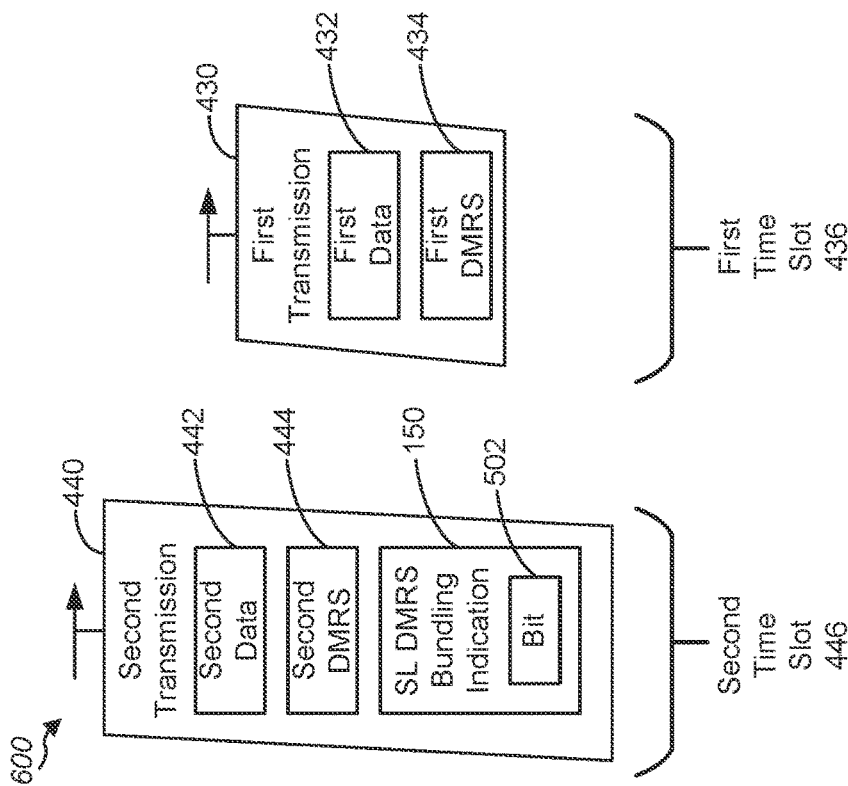
FIG. 6 is a diagram illustrating another example of a communication scheme according to some aspects of the disclosure.

FIG. 6 is a diagram illustrating another example of a communication scheme 600 according to some aspects of the disclosure. In the example of FIG. 6, the second transmission 440 includes the SL DMRS bundling indication 150, and the SL DMRS bundling indication 150 includes the bit 502. The bit 502 may have a value (e.g., a logic "0" value or a logic "1" value) indicating whether the joint channel estimation operation 462 is to be performed based on one or more prior DMRSs transmitted prior to the second DMRS 444, such as the first DMRS 434.

To further illustrate, a first value (e.g., a logic "0" value or a logic "1" value) of the bit 502 may indicate that bundling is enabled for N transmissions prior to the second transmission 440 (where N indicates a positive integer). As an illustrative example, if the bit 502 has the first value and if N corresponds to one, then the UE 115y may bundle the second DMRS 444 with one DMRS in a transmission prior to the second transmission 440 (such as the first DMRS 434 of the first transmission 430). A second value (e.g., a logic "1" value or a logic "0" value) of the bit 502 may indicate that bundling is disabled for the second transmission 440. In such examples, the UE 115y may avoid bundling the second DMRS 444 with another DMRS (such as the first DMRS 434).

FIG. 7 is a diagram illustrating another example of a communication scheme 700 according to some aspects of the disclosure. In the example of FIG. 7, the first transmission 430 includes the SL DMRS bundling indication 150. The SL DMRS bundling indication 150 of the first transmission 430 includes a first DMRS group identifier 702 associated with DMRSs to be bundled. For example, the UE 115y may perform the joint channel estimation operation 462 based on each DMRS associated with the first DMRS group identifier 702.

In the example of FIG. 7, the second transmission 440 also includes the SL DMRS bundling indication 150 including the first DMRS group identifier 702. In FIG. 7, because the first transmission 430 and the second transmission 440 each include the first DMRS group identifier 702, the UE 115y may determine that the first DMRS 434 and the second DMRS 444 belong to a common DMRS group. Based on determining that the first DMRS 434 and the second DMRS 444 belong to a common DMRS group, the UE 115y may perform the joint channel estimation operation 462 based on the first DMRS 434 and the second DMRS 444.

FIG. 8 is a diagram illustrating another example of a communication scheme 800 according to some aspects of the disclosure. In the example of FIG. 8, the first transmission 430 includes the SL DMRS bundling indication 150. The SL DMRS bundling indication 150 of the first transmission 430 includes the first DMRS group identifier 702 associated with DMRSs to be bundled. In some circumstances, the UE 115y may perform the joint channel estimation operation 462 based on each DMRS associated with the first DMRS group identifier 702, such as based on the first DMRS 434 and the second DMRS 444 if both the first transmission 430 and the second transmission 440 include the first DMRS group identifier 702.

In some other circumstances, the UE 115x may include another DMRS group identifier in the second transmission 440 that is associated with the second DMRS 444, such as a second DMRS group identifier 802 that is different than the first DMRS group identifier 702. To illustrate, in some circumstances, after transmitting the first transmission 430, the UE 115x may detect the condition 408 associated with cancelation of the joint channel estimation operation 462 (e.g., by detecting the change of operation 412). Based on detecting the condition 408, the UE 115x may transmit the second DMRS group identifier 802 associated with the second DMRS 444. As a result, in some examples, the UE 115x may cancel the joint channel estimation operation 462 by including the second DMRS group identifier 802 (instead of the first DMRS group identifier 702) in the second transmission 440.

After transmitting the second transmission 440 with the second DMRS group identifier 802, the UE 115x may determine whether phase continuity exists from the second transmission 440 to one or more subsequent transmissions. If the second transmission 440 has phase continuity with respect to the one or more subsequent transmissions, the UE 115x may include the second DMRS group identifier 802 with the one or more subsequent transmissions. In some other examples, if the UE 115x detects the condition 408 after transmitting the second transmission 440, the UE 115x may include another DMRS group identifier (e.g., a third DMRS group identifier) with the one or more subsequent transmissions.

One or more aspects described herein may be implemented using one or more sidelink channels, such as a PSCCH (e.g., the PSCCH of FIG. 3), a PSSCH (e.g. the PSSCH of FIG. 3), or a combination thereof. To illustrate, in some examples, one or more of the SL DMRS bundling indication 150, the first phase continuity message 422, or the second phase continuity message 424 are transmitted via a PSCCH, via a PSSCH, or any combination thereof. In some examples, one or more of the SL DMRS bundling indication 150, the first phase continuity message 422, or the second phase continuity message 424 are included in sidelink control information (SCI), such as in SCI of a PSCCH transmission or in SCI of a PSSCH transmission.

In some implementations, one or more aspects described herein may be used for sidelink communications between multiple user equipments (UEs), such as the UEs 115x-y. In some implementations, the UEs 115x-y may be battery-powered and may be mobile, in which case the UEs 115x-y may be sensitive to power consumption. Further, if the UEs 115x-y change physical location, channel tracking by the UEs 115x-y may be more difficult as compared to a stationary device (e.g., due to rapidly changing wireless channel conditions). By selectively enabling or disabling DMRS bundling, the UEs 115x-y may improve reliability of channel estimation (by using joint channel estimation based on "bundled" DMRSs, which may be advantageous in the presence of slowly changing wireless channel conditions) while also reducing power consumption (such as by disabling joint channel estimation in cases where phase discontinuity may reduce effectiveness of DMRS bundling). Alternatively or in addition, one or more aspects described herein may be used in other implementations, such as for one or more of uplink communications from a UE 115 to a base station 105, downlink communications from a base station 105 to a UE 115, or other communications.

One or more aspects described herein may improve performance of a wireless communication system. For example, by selectively enabling or disabling DMRS bundling, the receiver 458y may achieve benefits associated with DMRS bundling (such as improved channel tracking that may result from the joint channel estimation operation 462) while also reducing complexity and power consumption by disabling DMRS bundling when DMRSs are not phase-continuous (which may avoid computational complexity and power consumption that may be associated with the joint channel estimation operation 462). As a result, performance of the receiver 458y may be enhanced.

Figures 9, 10:
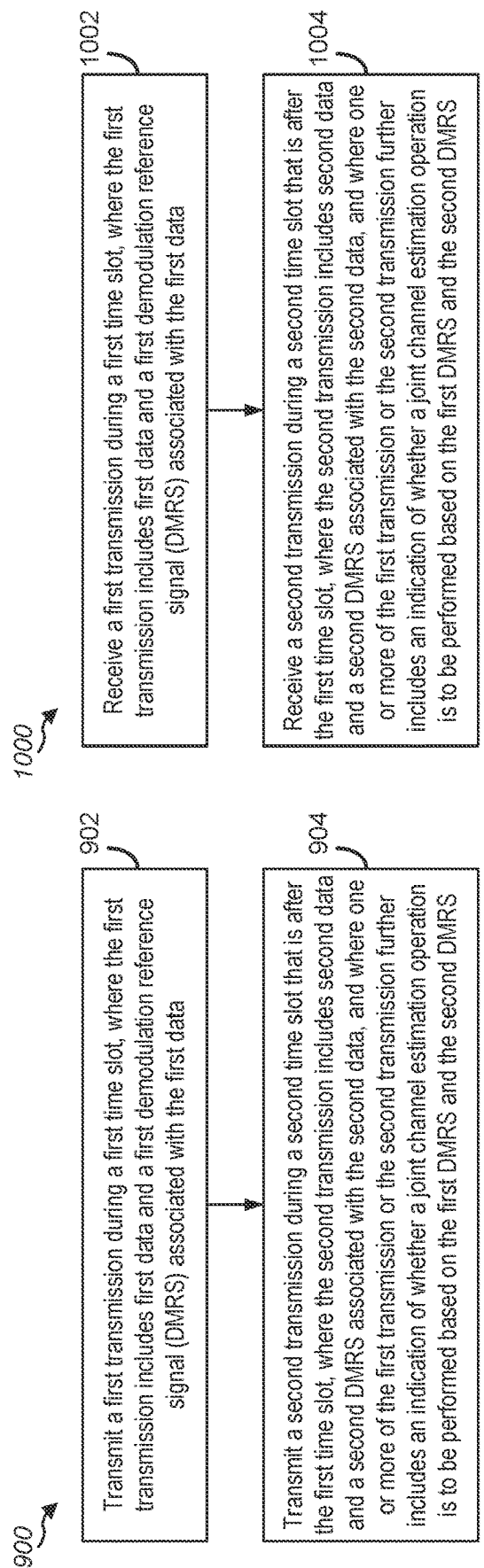
FIG. 9 is a flow diagram illustrating an example of a method of wireless communication performed by a UE according to some aspects of the disclosure.
FIG. 10 is a flow diagram illustrating another example of a method of wireless communication performed by a UE according to some aspects of the disclosure.

FIG. 9 is a flow chart illustrating an example of a method 900 of wireless communication that may be performed by a UE according to some aspects. In some examples, the method 900 may be performed by the UE 115x.

The method 900 includes transmitting a first transmission during a first time slot, at 902. The first transmission includes first data and a first DMRS associated with the first data. For example, the UE 115x may transmit the first transmission 430 to the UE 115y during the first time slot 436, and the first transmission 430 may include the first data 432 and the first DMRS 434.

The method 900 further includes transmitting a second transmission during a second time slot that is after the first time slot, at 904. The second transmission includes second data and a second DMRS associated with the second data. One or more of the first transmission or the second transmission further includes an indication of whether a joint channel estimation operation is to be performed based on the first DMRS and the second DMRS. For example, the UE 115x may transmit the second transmission 440 to the UE 115y during the second time slot 446, and the second transmission 440 may include the second data 442 and the second DMRS 444. One or more of the first transmission 430 or the second transmission 440 may include the SL DMRS bundling indication 150, which may indicate whether the joint channel estimation operation 462 is to be performed based on the first DMRS 434 and the second DMRS 444.

FIG. 10 is a flow chart illustrating an example of a method 1000 of wireless communication that may be performed by a UE according to some aspects. In some examples, the method 1000 may be performed by the UE 115y.

The method 1000 includes receiving a first transmission during a first time slot, at 1002. The first transmission includes first data and a first DMRS associated with the first data. For example, the UE 115y may receive the first transmission 430 from the UE 115x during the first time slot 436, and the first transmission 430 may include the first data 432 and the first DMRS 434.

The method 1000 further includes receiving a second transmission during a second time slot that is after the first time slot, at 1004. The second transmission includes second data and a second DMRS associated with the second data. One or more of the first transmission or the second transmission further includes an indication of whether a joint channel estimation operation is to be performed based on the first DMRS and the second DMRS. For example, the UE 115y may receive the second transmission 440 from the UE 115y during the second time slot 446, and the second transmission 440 may include the second data 442 and the second DMRS 444. One or more of the first transmission 430 or the second transmission 440 may include the SL DMRS bundling indication 150, which may indicate whether the joint channel estimation operation 462 is to be performed based on the first DMRS 434 and the second DMRS 444.

Figure 11:
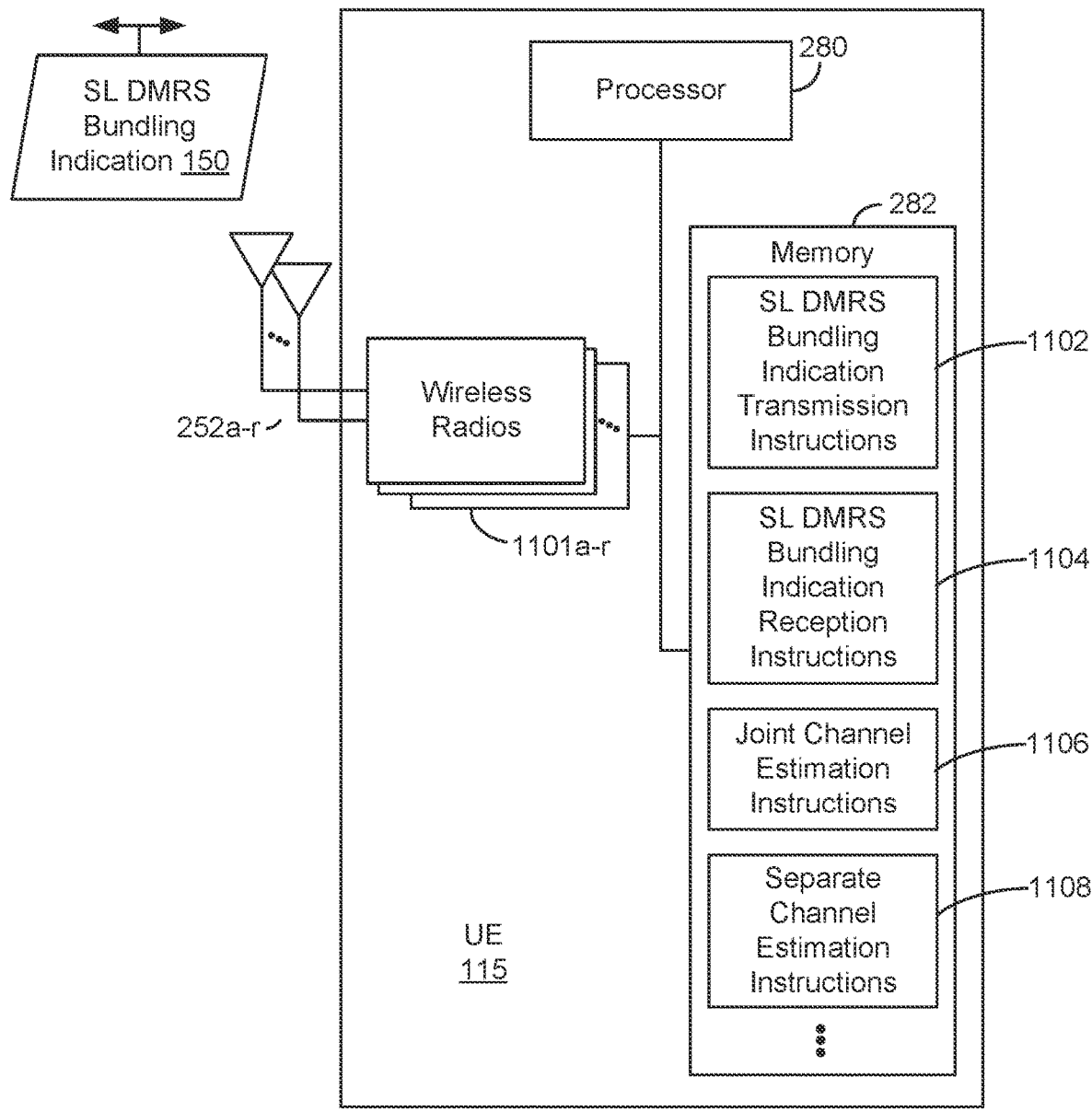
FIG. 11 is a block diagram of an example of a UE according to some aspects of the disclosure.

FIG. 11 is a block diagram illustrating an example of the UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 1101a-r and antennas 252a-r. The wireless radios 1101a-r may include one or more components or devices described herein, such as the modulator/demodulators 254a-r, the MIMO detector 256, the receive processor 258, the transmit processor 264, the TX MIMO processor 266, the transmitter 456x, the transmitter 456y, the receiver 458x, the receiver 458y, one or more other components or devices, or a combination thereof.

The memory 282 may store instructions executable by the processor 280 to initiate, perform, or control one or more operations described herein. For example, the memory 282 may store sidelink DMRS bundling indication transmission instructions 1102 executable by the processor 280 to initiate transmission of an indication (such as the sidelink DMRS bundling indication 150) to indicate whether the joint channel estimation operation 462 is to be performed. Alternatively or in addition, the memory 282 may store sidelink DMRS bundling indication reception instructions 1104 executable by the processor 280 to detect an indication (such as the sidelink DMRS bundling indication 150) of whether the joint channel estimation operation 462 is to be performed. In some examples, the memory 282 may store joint channel estimation instructions 1106 executable by the processor 280 (or another processor) to perform the joint channel estimation operation 462 (e.g., based on a first value of the sidelink DMRS bundling indication 150) and may store separate channel estimation instructions 1108 executable by the processor 280 (or another processor) to perform separate channel estimation operations using the DMRSs 434, 444 (e.g., based on a second value of the sidelink DMRS bundling indication 150).

To further illustrate some aspects of the disclosure, in a first aspect, an apparatus for wireless communication includes a receiver and a transmitter. The transmitter is configured to transmit a first transmission during a first time slot and to transmit a second transmission during a second time slot that is after the first time slot. The first transmission includes first data and a first DMRS associated with the first data, and the second transmission includes second data and a second DMRS associated with the second data. One or more of the first transmission or the second transmission further includes an indication of whether a joint channel estimation operation is to be performed based on the first DMRS and the second DMRS.

In a second aspect alternatively or in addition to the first aspect, the indication is included in the first transmission, and the indication includes a bit having a value indicating whether the joint channel estimation operation is to be performed based on one or more subsequent DMRSs that include the second DMRS.

In a third aspect alternatively or in addition to one or more of the first through second aspects, the indication is included in the second transmission, and the indication includes a bit having a value indicating whether the joint channel estimation operation is to be performed based on one or more prior DMRSs that include the first DMRS.

In a fourth aspect alternatively or in addition to one or more of the first through third aspects, the indication includes a first DMRS group identifier, and the joint channel estimation operation is to be performed based on each DMRS associated with the first DMRS group identifier.

In a fifth aspect alternatively or in addition to one or more of the first through fourth aspects, both the first transmission and the second transmission include the first DMRS group identifier.

In a sixth aspect alternatively or in addition to one or more of the first through fifth aspects, the first transmission includes the indication, and the transmitter is further configured to transmit, based on a condition associated with cancelation of the joint channel estimation operation, a second DMRS group identifier associated with the second DMRS during the second time slot, the second DMRS group identifier different than the first DMRS group identifier.

In a seventh aspect alternatively or in addition to one or more of the first through sixth aspects, the condition includes a loss of phase continuity associated with an RF device based on one or more of a change of operation of the RF device from one of a transmit mode or a receive mode to the other of the transmit mode or the receive mode, a change of a beam associated with the RF device, a change of bandwidth associated with the RF device, or a change in a center frequency associated with the RF device, and the RF device includes one or both of the transmitter or the receiver.

In an eighth aspect alternatively or in addition to one or more of the first through seventh aspects, the transmitter is further configured to transmit a first message indicating that a transmit side phase difference between a first phase associated with the first DMRS and a second phase associated with the second DMRS is to be less than a threshold phase difference.

In a ninth aspect alternatively or in addition to one or more of the first through eighth aspects, the receiver is configured to receive a second message indicating that a receive side phase difference between the first phase associated with the first DMRS and the second phase associated with the second DMRS is to be less than the threshold phase difference.

In a tenth aspect alternatively or in addition to one or more of the first through ninth aspects, the indication is included in SCI of a PSCCH transmission or in SCI of a PSSCH transmission.

In an eleventh aspect alternatively or in addition to one or more of the first through tenth aspects, a method of wireless communication includes transmitting a first transmission during a first time slot. The first transmission includes first data and a first DMRS associated with the first data. The method further includes transmitting a second transmission during a second time slot that is after the first time slot. The second transmission includes second data and a second DMRS associated with the second data. One or more of the first transmission or the second transmission further includes an indication of whether a joint channel estimation operation is to be performed based on the first DMRS and the second DMRS.

In a twelfth aspect alternatively or in addition to one or more of the first through eleventh aspects, the indication is included in the first transmission, and the indication includes a bit having a value indicating whether the joint channel estimation operation is to be performed based on one or more DMRSs subsequent to the first DMRS, the one or more DMRSs including the second DMRS.

In a thirteenth aspect alternatively or in addition to one or more of the first through twelfth aspects, the indication is included in the second transmission, and the indication includes a bit having a value indicating whether the joint channel estimation operation is to be performed based on one or more DMRSs prior to the second DMRS, the one or more DMRSs including the first DMRS.

In a fourteenth aspect alternatively or in addition to one or more of the first through thirteenth aspects, the indication includes a first DMRS group identifier, and the joint channel estimation operation is to be performed based on each DMRS associated with the first DMRS group identifier.

In a fifteenth aspect alternatively or in addition to one or more of the first through fourteenth aspects, both the first transmission and the second transmission include the first DMRS group identifier.

In a sixteenth aspect alternatively or in addition to one or more of the first through fifteenth aspects, the first transmission includes the indication, and the method includes, after transmitting the first transmission, detecting a condition associated with cancelation of the joint channel estimation operation, and based on the condition, transmitting a second DMRS group identifier associated with the second DMRS during the second time slot, the second DMRS group identifier different than the first DMRS group identifier.

In a seventeenth aspect alternatively or in addition to one or more of the first through sixteenth aspects, detecting the condition includes detecting a loss of phase continuity associated with an RF device based on one or more of a change of operation of the RF device from one of a transmit mode or a receive mode to the other of the transmit mode or the receive mode, a change of a beam associated with the RF device, a change of bandwidth associated with the RF device, or a change in a center frequency associated with the RF device.

In an eighteenth aspect alternatively or in addition to one or more of the first through seventeenth aspects, the method includes transmitting a first message indicating that a transmit side phase difference between a first phase associated with the first DMRS and a second phase associated with the second DMRS is to be less than a threshold phase difference and receiving a second message indicating that a receive side phase difference between the first phase associated with the first DMRS and the second phase associated with the second DMRS is to be less than the threshold phase difference.

In a nineteenth aspect alternatively or in addition to one or more of the first through eighteenth aspects, the indication is included in SCI of a PSCCH transmission or in SCI of a PSSCH transmission.

In a twentieth aspect alternatively or in addition to one or more of the first through nineteenth aspects, an apparatus for wireless communication includes a transmitter and a receiver. The receiver is configured to receive a first transmission during a first time slot and to receive a second transmission during a second time slot that is after the first time slot. The first transmission includes first data and a first DMRS associated with the first data, and the second transmission includes second data and a second DMRS associated with the second data. The receiver is further configured to perform, based on an indication included in one or more of the first transmission or the second transmission, a joint channel estimation operation using the first DMRS and the second DMRS.

In a twenty-first aspect alternatively or in addition to one or more of the first through twentieth aspects, the indication is included in the first transmission, and the indication includes a bit having a value indicating whether the joint channel estimation operation is to be performed based on one or more subsequent DMRSs that include the second DMRS.

In a twenty-second aspect alternatively or in addition to one or more of the first through twenty-first aspects, the indication is included in the second transmission, and the indication includes a bit having a value indicating whether the joint channel estimation operation is to be performed based on one or more prior DMRSs that include the first DMRS.

In a twenty-third aspect alternatively or in addition to one or more of the first through twenty-second aspects, the indication includes a first DMRS group identifier, and the joint channel estimation operation is to be performed based on each DMRS associated with the first DMRS group identifier.

In a twenty-fourth aspect alternatively or in addition to one or more of the first through twenty-third aspects, both the first transmission and the second transmission include the first DMRS group identifier.

In a twenty-fifth aspect alternatively or in addition to one or more of the first through twenty-fourth aspects, the first transmission includes the indication, and the receiver is further configured to receive a second DMRS group identifier associated with the second DMRS during the second time slot, the second DMRS group identifier different than the first DMRS group identifier.

In a twenty-sixth aspect alternatively or in addition to one or more of the first through twenty-fifth aspects, the receiver is further configured to receive a first message indicating that a transmit side phase difference between a first phase associated with the first DMRS and a second phase associated with the second DMRS is to be less than a threshold phase difference.

In a twenty-seventh aspect alternatively or in addition to one or more of the first through twenty-sixth aspects, the transmitter is configured to transmit a second message indicating that a receive side phase difference between the first phase associated with the first DMRS and the second phase associated with the second DMRS is to be less than the threshold phase difference.

In a twenty-eighth aspect alternatively or in addition to one or more of the first through twenty-seventh aspects, a method of wireless communication includes receiving a first transmission during a first time slot. The first transmission includes first data and a first DMRS associated with the first data. The method further includes receiving a second transmission during a second time slot that is after the first time slot. The second transmission includes second data and a second DMRS associated with the second data. One or more of the first transmission or the second transmission further includes an indication of whether a joint channel estimation operation is to be performed based on the first DMRS and the second DMRS.

In a twenty-ninth aspect alternatively or in addition to one or more of the first through twenty-eighth aspects, the method includes performing the joint channel estimation operation based on the indication specifying that the first DMRS is associated with the second DMRS.

In a thirtieth aspect alternatively or in addition to one or more of the first through twenty-ninth aspects, the method includes, based on the indication specifying that the first DMRS is not associated with the second DMRS, performing a first channel estimation operation based on the first DMRS and independently of the second DMRS and performing a second channel estimation operation based on the second DMRS and independently of the first DMRS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, the functional blocks, and the modules described herein may include processors, electronics devices, hardware devices, electronics components, logical circuits, memories, and/or software, among other examples, or any combination thereof. Software shall be construed broadly to mean instructions, instruction sets, code(s), code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

The various illustrative logics, logical blocks, modules, circuits and operations described herein may be implemented as electronic hardware, computer software, or combinations of both. Some examples been described generally, in terms of functionality, and illustrated in the various illustrative components, blocks, modules, circuits and processes described above. Whether such functionality is implemented in hardware or software may depend upon the particular application and design of the overall system.

A hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, software, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or process disclosed herein may be implemented in a processor-executable software module which may reside on a computer-readable medium. A storage medium may be any media that may be accessed by a computer. By way of example, and not limitation, such computer-readable media may include random-access memory (RAM), read-only memory (ROM), flash memory, phase change memory, electrically erasable programmable read-only memory (EE- PROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
  a receiver; and
  a transmitter configured to transmit a first transmission during a first time slot and to transmit a second transmission during a second time slot that is after the first time slot, wherein the first transmission includes first data and a first demodulation reference signal (DMRS) associated with the first data, wherein the second transmission includes second data and a second DMRS associated with the second data, and wherein one or more of the first transmission or the second transmission further includes an indication of whether a joint channel estimation operation is to be performed based on the first DMRS and the second DMRS, wherein the indication includes a first DMRS group identifier, and wherein the joint channel estimation operation is to be performed based on one or more DMRS associated with the first DMRS group identifier.

2. The apparatus of claim 1, wherein the indication is included in the first transmission, and wherein the indication includes a bit having a value indicating whether the joint channel estimation operation is to be performed based on one or more subsequent DMRSs that include the second DMRS.

3. The apparatus of claim 1, wherein the indication is included in the second transmission, and wherein the indication includes a bit having a value indicating whether the joint channel estimation operation is to be performed based on one or more prior DMRSs that include the first DMRS.

4. The apparatus of claim 1, wherein both the first transmission and the second transmission include the first DMRS group identifier.

5. The apparatus of claim 1, wherein the first transmission includes the indication, and wherein the transmitter is further configured to transmit, based on a condition associated with cancelation of the joint channel estimation operation, a second DMRS group identifier associated with the second DMRS during the second time slot, the second DMRS group identifier different than the first DMRS group identifier.

6. The apparatus of claim 5, wherein the condition includes a loss of phase continuity associated with a radio frequency (RF) device based on one or more of a change of operation of the RF device from one of a transmit mode or a receive mode to the other of the transmit mode or the receive mode, a change of a beam associated with the RF device, a change of bandwidth associated with the RF device, or a change in a center frequency associated with the RF device, and wherein the RF device includes one or both of the transmitter or the receiver.

7. The apparatus of claim 1, wherein the transmitter is further configured to transmit a first message indicating that a transmit side phase difference between a first phase associated with the first DMRS and a second phase associated with the second DMRS is to be less than a threshold phase difference.

8. The apparatus of claim 7, wherein the receiver is configured to receive a second message indicating that a receive side phase difference between the first phase associated with the first DMRS and the second phase associated with the second DMRS is to be less than the threshold phase difference.

9. The apparatus of claim 1, wherein the indication is included in sidelink control information (SCI) of a physical sidelink control channel (PSCCH) transmission or in SCI of a physical sidelink shared channel (PSSCH) transmission.

10. A method of wireless communication, the method comprising:
   transmitting a first transmission during a first time slot, wherein the first transmission includes first data and a first demodulation reference signal (DMRS) associated with the first data; and
   transmitting a second transmission during a second time slot that is after the first time slot, wherein the second transmission includes second data and a second DMRS associated with the second data, and
   wherein one or more of the first transmission or the second transmission further includes an indication of whether a joint channel estimation operation is to be performed based on the first DMRS and the second DMRS, wherein the indication includes a first DMRS group identifier, and wherein the joint channel estimation operation is to be performed based on one or more DMRS associated with the first DMRS group identifier.

11. The method of claim 10, wherein the indication is included in the first transmission, and wherein the indication includes a bit having a value indicating whether the joint channel estimation operation is to be performed based on one or more DMRSs subsequent to the first DMRS, the one or more DMRSs including the second DMRS.

12. The method of claim 10, wherein the indication is included in the second transmission, and wherein the indication includes a bit having a value indicating whether the joint channel estimation operation is to be performed based on one or more DMRSs prior to the second DMRS, the one or more DMRSs including the first DMRS.

13. The method of claim 10, wherein both the first transmission and the second transmission include the first DMRS group identifier.

14. The method of claim 10, wherein the first transmission includes the indication, and further comprising:
   after transmitting the first transmission, detecting a condition associated with cancelation of the joint channel estimation operation; and
   based on the condition, transmitting a second DMRS group identifier associated with the second DMRS during the second time slot, the second DMRS group identifier different than the first DMRS group identifier.

15. The method of claim 14, wherein detecting the condition includes detecting a loss of phase continuity associated with a radio frequency (RF) device based on one or more of a change of operation of the RF device from one of a transmit mode or a receive mode to the other of the transmit mode or the receive mode, a change of a beam associated with the RF device, a change of bandwidth associated with the RF device, or a change in a center frequency associated with the RF device.

16. The method of claim 10, further comprising:
   transmitting a first message indicating that a transmit side phase difference between a first phase associated with the first DMRS and a second phase associated with the second DMRS is to be less than a threshold phase difference; and
   receiving a second message indicating that a receive side phase difference between the first phase associated with the first DMRS and the second phase associated with the second DMRS is to be less than the threshold phase difference.

17. The method of claim 10, wherein the indication is included in sidelink control information (SCI) of a physical sidelink control channel (PSCCH) transmission or in SCI of a physical sidelink shared channel (PSSCH) transmission.

18. An apparatus for wireless communication, the apparatus comprising:
   a transmitter; and
   a receiver configured to receive a first transmission during a first time slot and to receive a second transmission during a second time slot that is after the first time slot, wherein the first transmission includes first data and a first demodulation reference signal (DMRS) associated with the first data, wherein the second transmission includes second data and a second DMRS associated with the second data, and wherein the receiver is further configured to perform, based on an indication included in one or more of the first transmission or the second transmission, a joint channel estimation operation using the first DMRS and the second DMRS, wherein the indication includes a first DMRS group identifier, and wherein the joint channel estimation operation is to be performed based on one or more DMRS associated with the first DMRS group identifier.

19. The apparatus of claim 18, wherein the indication is included in the first transmission, and wherein the indication includes a bit having a value indicating whether the joint channel estimation operation is to be performed based on one or more subsequent DMRSs that include the second DMRS.

20. The apparatus of claim 18, wherein the indication is included in the second transmission, and wherein the indication includes a bit having a value indicating whether the joint channel estimation operation is to be performed based on one or more prior DMRSs that include the first DMRS.

21. The apparatus of claim 18, wherein both the first transmission and the second transmission include the first DMRS group identifier.

22. The apparatus of claim 18, wherein the first transmission includes the indication, and wherein the receiver is further configured to receive a second DMRS group identifier associated with the second DMRS during the second time slot, the second DMRS group identifier different than the first DMRS group identifier.

23. The apparatus of claim 18, wherein the receiver is further configured to receive a first message indicating that a transmit side phase difference between a first phase associated with the first DMRS and a second phase associated with the second DMRS is to be less than a threshold phase difference.

24. The apparatus of claim 23, wherein the transmitter is configured to transmit a second message indicating that a receive side phase difference between the first phase associated with the first DMRS and the second phase associated with the second DMRS is to be less than the threshold phase difference.

25. A method of wireless communication, the method comprising:
   receiving a first transmission during a first time slot, wherein the first transmission includes first data and a first demodulation reference signal (DMRS) associated with the first data; and
   receiving a second transmission during a second time slot that is after the first time slot, wherein the second transmission includes second data and a second DMRS associated with the second data, and
   wherein one or more of the first transmission or the second transmission further includes an indication of whether a joint channel estimation operation is to be performed based on the first DMRS and the second DMRS, wherein the indication includes a first DMRS group identifier, and wherein the joint channel estimation operation is to be performed based on one or more DMRS associated with the first DMRS group identifier.

26. The method of claim 25, further comprising performing the joint channel estimation operation based on the indication specifying that the first DMRS is associated with the second DMRS.

27. The method of claim 25, further comprising, based on the indication specifying that the first DMRS is not associated with the second DMRS:
   performing a first channel estimation operation based on the first DMRS and independently of the second DMRS; and
   performing a second channel estimation operation based on the second DMRS and independently of the first DMRS.

\* \* \* \* \*